June 24, 1924.  
O. H. WILLIAMS  
RESILIENT TIRE  
Filed Feb. 11, 1924  
1,499,276

ORR H. WILLIAMS, Inventor

Patented June 24, 1924.

1,499,276

UNITED STATES PATENT OFFICE.

ORR H. WILLIAMS, OF COLUMBUS, OHIO, ASSIGNOR TO THE LANCASTER TIRE AND RUBBER COMPANY, OF COLUMBUS, OHIO, A CORPORATION OF OHIO.

RESILIENT TIRE.

Application filed February 11, 1924. Serial No. 691,947.

*To all whom it may concern:*

Be it known that I, ORR H. WILLIAMS, a citizen of the United States, residing at Columbus, in the county of Franklin and State of Ohio, have invented a certain new and useful Improvement in Resilient Tires, of which the following is a specification.

The object of this invention is to provide an improved automobile tire casing of the so called non-skid type with a construction of tread adapted not only to present numerous edges adapted to effectively prevent lateral skidding but also to utilize to some extent the principal of a vacuum with air pressure tending to make the tire grip the road.

The invention is embodied in the example herein shown and described, the feature or features of novelty being finally claimed.

In the accompanying drawings—

Figure 1:
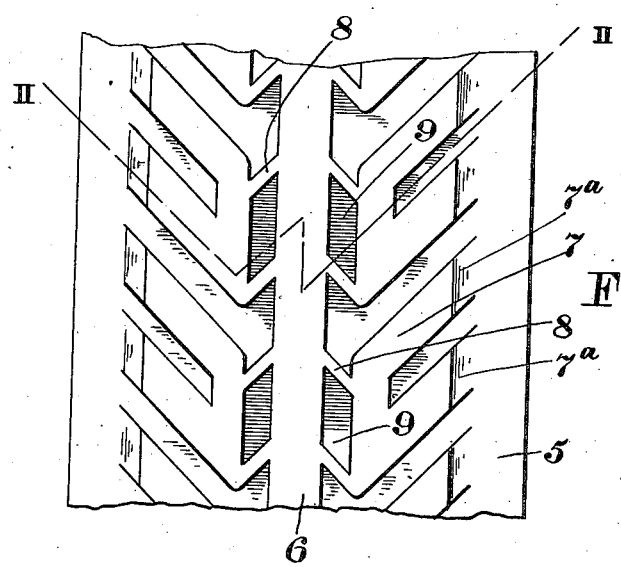
Fig. 1 is a plan view of a fraction of the tread construction.
Figure 2:
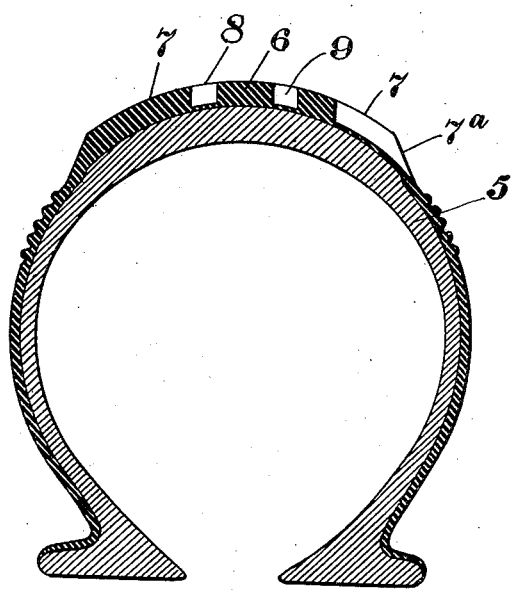
Fig. 2 is a section on the line II—II Fig. 1.

In the views 5 designates the body of the casing, the tread being formed with a central circumambient rib 6 flanked on each side by stout slanting U-shaped protrusions 7 shown as set parallel to each other and at an inclination of about forty-five degrees to the central rib 6. The ends of the legs of these protrusions 7 are beveled or tapered off, as shown at 7ª, the body of the casing thereby affording a bracing effect to said ends. Connecting the base or the inner end of each of the U-shaped protrusions 7 is a pair of slender walls 8, said walls being spaced from each other and inclined at about a right angle to the direction of the legs of the U-protrusion. The walls 8, in connection with the middle rib 6 and base of the U-protrusion, form a pocket 9. When the tread of the casing at the region of contact with the road is flattened by the load of the car the lateral U-protrusions are caused to approach the circumambient rib thereby flexing the walls 8 which are made slender to permit this, thereby contracting said pockets and forcing out the contained air. Upon the tendency of these pockets to expand as the load is gradually lessened by the roll of the tire a vacuum is created tending to press the walls against the road. Because the legs of the U-shaped protrusion are also inclined to a line transversely of the tire such legs tend to resist lateral skidding of the tire.

The forms of the parts can be changed somewhat without departing from the gist of the invention as claimed.

What I claim is:

1. A tire tread including, in combination, a central circumambient rib, a series of stout U-shaped protrusions flanking the same, and a pair of inclined slender walls connecting the base of each of the U-shaped protrusions with said central rib.

2. A tire tread including, in combination, a central circumambient rib, a series of stout U-shaped protrusions flanking and inclined to the same, and a pair of inclined slender walls connecting the base of each of the U-shaped protrusions with said central rib.

3. A tire tread including, in combination, a central circumambient rib, a series of stout U-shaped protrusions flanking and inclined to said rib and a pair of slender walls opposingly inclined to each of said protrusions and connecting them and the rib.

4. A tire tread including, in combination, a central circumambient rib, and a series of stout U-shaped protrusions inclined to and flanking the rib.

5. A tire tread including, in combination, a central circumambient rib, and a series of stout U-shaped protrusions spaced from, inclined to and flanking the rib.

ORR H. WILLIAMS.